United States Patent
McDermott

[11] Patent Number: 6,062,785
[45] Date of Patent: May 16, 2000

[54] ANCHORING FASTENER

[76] Inventor: Troy McDermott, 17721 Misty La., Huntington Beach, Calif. 92649

[21] Appl. No.: 09/134,988

[22] Filed: Aug. 17, 1998

[51] Int. Cl.$^7$ .............................. F16B 21/00; F16B 13/04
[52] U.S. Cl. ............................ 411/344; 411/345; 411/346
[58] Field of Search ................................ 411/34–38, 340, 411/341, 342, 343, 344, 345, 346

[56] References Cited

U.S. PATENT DOCUMENTS

| | | | |
|---|---|---|---|
| 2,916,235 | 12/1959 | Nagel | 248/29 |
| 3,241,420 | 3/1966 | Passer | 411/346 |
| 3,513,746 | 5/1970 | Forsberg | 411/346 |
| 3,851,560 | 12/1974 | Yago . | |
| 3,872,768 | 3/1975 | Ernst et al. . | |
| 4,245,545 | 1/1981 | Freeman | 411/342 |
| 4,500,238 | 2/1985 | Vassiliou | 411/30 |
| 4,704,057 | 11/1987 | McSherry | 411/55 |
| 4,907,716 | 3/1990 | Wankel et al. | 220/326 |
| 4,997,327 | 3/1991 | Cira | 411/342 |
| 5,226,768 | 7/1993 | Speer | 411/344 |
| 5,509,765 | 4/1996 | Algin | 411/38 |
| 5,690,454 | 11/1997 | Smith | 411/30 |

*Primary Examiner*—Neill Wilson
*Attorney, Agent, or Firm*—Dennis W. Beech

[57] ABSTRACT

The fastening element uses a sleeve with a flanged end to insert in a hole drilled through an object, such as, a sign, and a structural element to which the object is to be attached. This allows the user to place the object in the position to be mounted and to drill a single hole of uniform diameter and insert the sleeve. An expandable element which either uses a plurality of bendable legs, or a pair of toggle elements, similar to a Toggle Bolt, is inserted with the sleeve to provide anchor members behind the structural element, such as a wall. The fastening element essentially allows one step drilling of a hole and securing of an object to a structure particularly in instance where access for use of a fastening nut on a bolt is not possible. The head of the bolt is of a sufficient radius to cover the flanged end of the sleeve when the fastening element is secured. The toggle element may also be used without the sleeve.

9 Claims, 3 Drawing Sheets

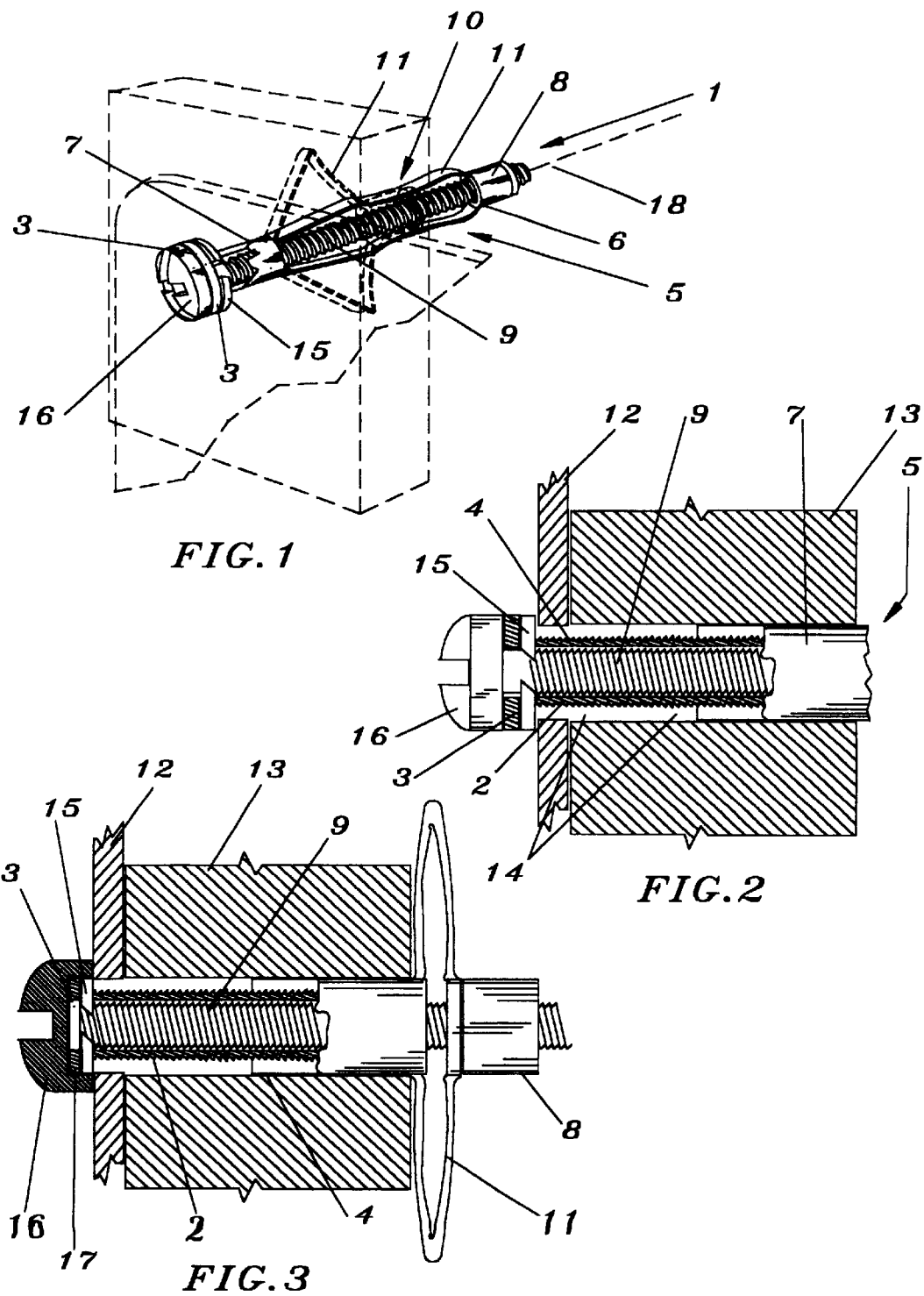

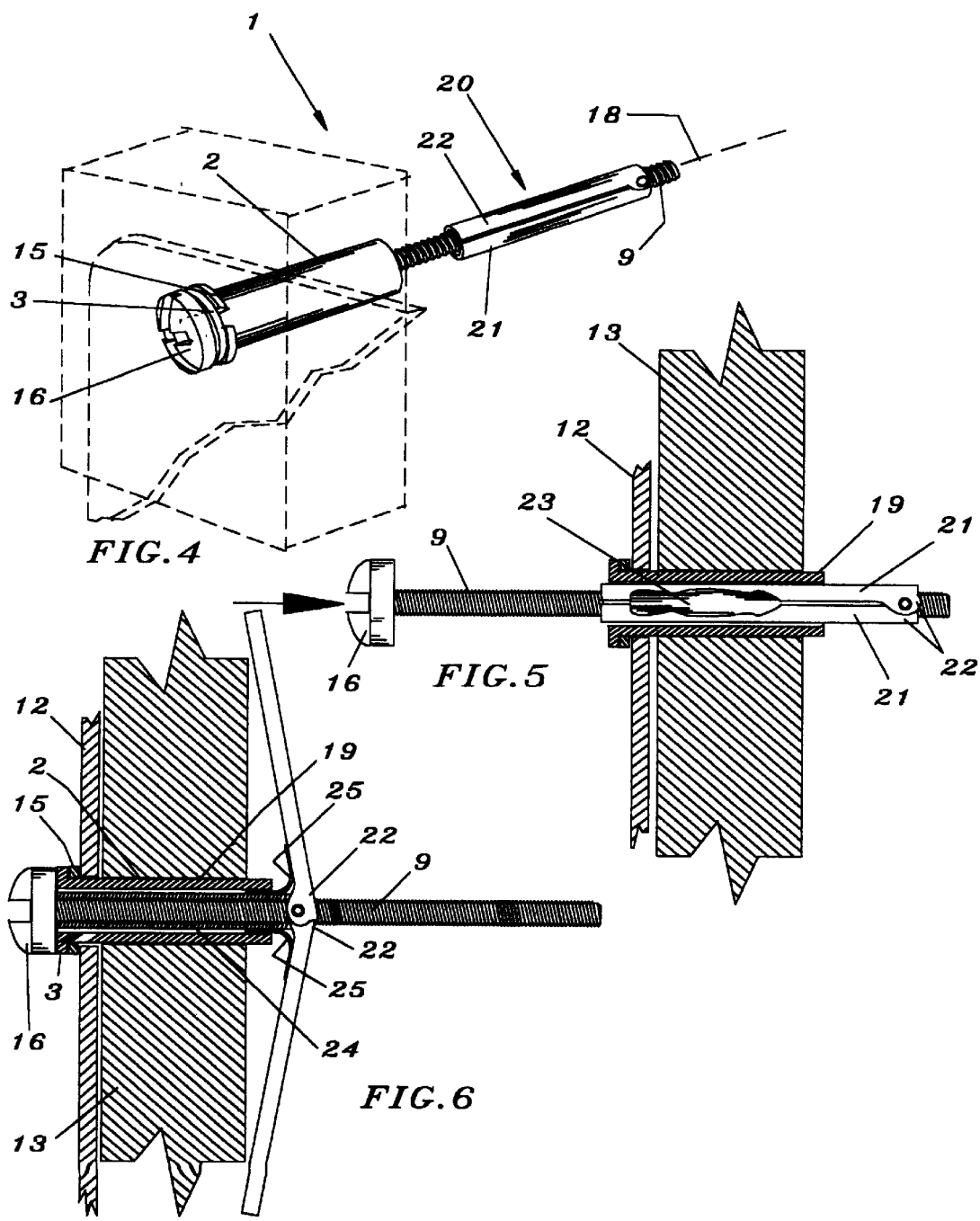

ANCHORING FASTENER

BACKGROUND OF THE INVENTION

1. Field of the Invention

This invention relates to devices used to anchor or fasten objects to a structural element such as a sign to a wall or frame member where access to use a fastening nut for a bolt is not available or structural support for a screw or bolt is not adequate. The new device allows an opening to be formed or drilled through the object to be fastened and the structure and then insertion of the fastening device without the need to remove and reposition the object.

2. Description of Related Art

There are in use a wide variety of fastening and anchor devices designed to work in a blind structural mounting situation. The commonly known Molly Bolt and Toggle Bolt are two examples of this type of fastener. Normally to use such fasteners a hole of a size large enough to receive the expandable element of the fastener is drilled in the mounting structure, such as, a wall. The expandable element is then inserted in the hole and fastened, then the object is placed over the mounting location and a screw or bolt inserted and threaded into the expandable element to retain the object.

Alternatively, after the hole is drilled, normally in the case of a Toggle Bolt, the bolt is placed through a hole in the object to be mounted and the expandable toggle element threaded on the end of the bolt. Then the expandable toggle element is pushed into the hole and the object is secured by turning the bolt to force the expanded toggle arms against the structure.

One variation of this general category of fastener is disclosed in U.S. Pat. No. 5,226,768 issued Jul. 13, 1993. In this instance the fastening device uses a pair of toggle elements retained in peripheral apertures in a hollow cylinder with one end threaded to receive a bolt. When a bolt is inserted into the cylinder it forces the toggle elements into an expanded configuration to secure against a structure such as a wall. In this case the expandable element may be inserted through a hole in the object to be mounted and the mounting structure without first lifting the object to insert the expandable element. However, the expandable mechanism is quite complicated and the bolt head is not designed to cover the expandable element flanged head.

Another example is U.S. Pat. No. 5,690,454 issued Nov. 25, 1997 which by its disclosure is in general structure similar to the well known metal Molly Bolt. The device has expandable legs or sections forming the middle portion. When a bolt or screw is inserted and turned to draw the head portion toward the outer portion the legs buckle and expand to be drawn against the structure to hold the expandable element. This device like the common Molly Bolt is designed to first fit the expandable element and then place the object to be mounted in position and secure it with a bolt or screw.

The present invention uses a hollow cylindrical sleeve element with a flanged end that is sized to be used in a common opening formed in a object and a structural element to which the object is to be attached. In the case of the use of a toggle element an object is position on a mounting structure, a hole is formed by for example drilling, the sleeve element is inserted and then the toggle element and bolt are inserted through the cylinder sleeve to then be secured. For a buckling legs element again an object is position on a mounting structure, a hole is formed, and then the sleeve with buckling legs element attached and adjusted for proper length is inserted in the hole to secure the object to the structure. In each case the flange has a diameter no larger than the head of the securing bolt or screw such that it will be covered when the mounting operation is completed. For the toggle element the use of the sleeve element may be eliminated. These devices eliminate the step of removing the object to insert a toggle element or first mounting the expandable element and then securing the object to be mounted.

SUMMARY OF THE INVENTION

One object of the present invention is to allow placing an object on the structure to be mounted and then forming a hole in both the object and structure through which the fastening element is inserted and secured. Another object is a variable length fastening element to accommodate different thickness objects and structural elements to which they are to be mounted. A further object is that the head of the mounting bolt or screw will cover the flange of the sleeve used for the mounting element.

In accordance with the description presented herein, other objectives of this invention will become apparent when the description and drawings are reviewed.

BRIEF DESCRIPTION OF THE DRAWING

FIG. 1 illustrates a perspective view of the fastening element with the legs shown partially buckled in dashed lines.

FIG. 2 illustrates a side partial cross-sectional view of the fastening element inserted in a hole through an object and structural element.

FIG. 3 illustrates a side cross-sectional view of the fastening element with bolt head cavity and legs expanded.

FIG. 4 illustrates a perspective view of an alternative embodiment with toggle members folded together circumferentially around the toggle sleeve.

FIG. 5 illustrates a side partial cross-sectional view of the fastening element with bolt partially inserted through the sleeve.

FIG. 6 illustrates a side partial cross-sectional view of the fastening element inserted in a hole through an object and structural element.

DESCRIPTION OF THE PREFERRED EMBODIMENT

Figure 7:
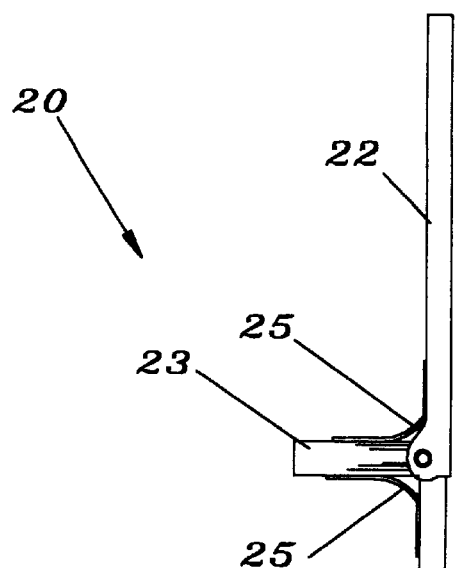
FIG. 7 illustrates a side view of the toggle sleeve with toggle members fully extended.

The fastening element has a hollow cylindrical sleeve with one end flanged. This sleeve is inserted in a hole drilled in an object and in the structure on which it is to be mounted. The fastening element is intended for mounting to structures such as walls where access to use a fastening nut is not possible and there is not sufficient support structure for use of a threaded screw alone. Either a toggle element expandable device or buckling legs expandable device may be used with the sleeve. In the case of the toggle element, it may also be used without a sleeve.

Referring to FIGS. 1 through 3, a fastening element (1) has a hollow cylindrical sleeve (2) with a flanged end (3). The sleeve (2) has threaded an outer surface (4) onto which is threaded the expandable element (5). The expandable element (5) has an axial cavity (6) with a sleeve end (7) threaded internally to fit the sleeve (2) and an inner head (8) threaded internally to receive a threaded bolt (9). A middle portion (10) is disposed between the sleeve end (7) and the inner head (8). The axial cavity (6) passes through the length of the expandable element (5). The middle portion (10) has a plurality of legs (11) which are designed to buckle when the inner head (8) is drawn along the longitudinal axis (18) toward the sleeve end (7) by the bolt (9).

The threads of the sleeve (2) and sleeve end (7) are formed to cause a friction fit such that it is difficult for one element to rotate relative to the other without significant force being applied. This allows positioning the expandable element (5) on the sleeve (2) for the proper length to accommodate the thickness of the object (12) and structural element (13) to which it is to be mounted, then inserting the elements in a hole (14) formed in the object (12) and structural element (13), and finally tightening the fastening element (1) without the length changing.

The tightening or securing is accomplished by rotating the bolt (9) which is inserted through the sleeve (2) and axial cavity (6) to thread into the inner head (8). The rotation of bolt (9) draws the inner head (8) toward the sleeve end (7) which causes the legs (11) to buckle and expand outward. As the inner head (8) is drawn to the sleeve end (7) the legs (11) fold to contact the mounting structure element (13) and secure the object (12) thereto. Use of a lock washer (15) prevents unwanted rotation of the sleeve (2) and attached elements. The flanged end (3) is of a radius such that the head (16) of the bolt (9) covers the flanged end (3) once mounting is complete. The bolt head (16) may also be a larger radius as in FIG. 3 and have a cavity (17) therein into which the flanged end (3) and lock washer (15) fit.

Referring to FIGS. 4 through 7, the fastening element (1) sleeve (2) has a smooth outer surface (19). The expandable element (20) has two toggle members (21) which are attached at their adjacent ends (22) to one end of a toggle sleeve (23) which is hollow and threaded on its inner surface (24). The toggle sleeve (23) is threaded onto the bolt (9). A spring (25) is attached between each toggle member (21) and toggle sleeve (23).

A hole (14) is formed in the object (12) and structural element (13) through which the sleeve (2) is inserted; then the bolt (9) with expandable element (20) attached is inserted through the sleeve (2) to allow the toggle members (21) to expand outward behind the structural element (13); and finally the bolt (9) is rotated to tighten the toggle members (21) against the structural element (13). Again as described in the previous embodiment a lock washer (15) may be used and the head (16) of the bolt (9) is of a large enough diameter to cover the flanged end (3).

Figure 8:
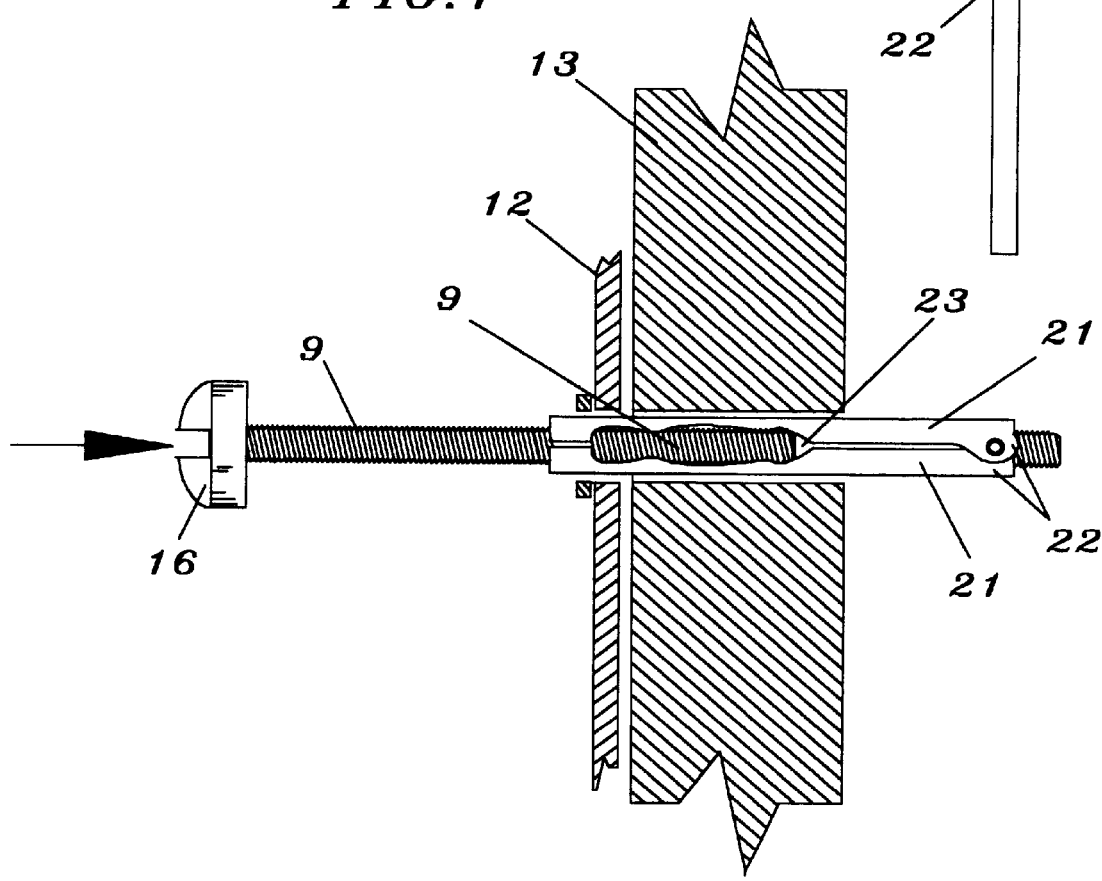
FIG. 8 illustrates a side view of the fastening element with bolt partially inserted through an object and structure without the use of a sleeve.

FIG. 8 illustrates the use of the fastening element (1) without the use of the sleeve (2).

While the invention has been particularly shown and described with respect to the illustrated and preferred embodiments thereof, it will be understood by those skilled in the art that the foregoing and other changes in form and details may be made therein without departing from the spirit and scope of the invention.

I claim:

1. A fastening device for attachment of an object to a structural element comprising:

a sleeve of hollow cylindrical shape with a flanged end;

a pair of toggle members attached at their adjacent ends to one end of a toggle sleeve and having a spring attached to each toggle member and the toggle sleeve; and the toggle sleeve of hollow cylindrical form having axially along the longitudinal axis an inner surface defined therein which is threaded to receive a bolt.

2. The fastening element as in claim 1 wherein the bolt having a head of radius large enough to cover the flanged end when the fastening element is secured.

3. The fastening element as in claim 1 wherein a lock washer is used between the flanged end and said object to be attached.

4. The fastening element as in claim 3 wherein the bolt having a head of radius large enough to have a cavity defined therein which encloses the flanged end and lock washer when the fastening element is secured.

5. The fastening element as in claim 1 wherein the toggle members are of approximately semicircular cross section to fit around the toggle sleeve when folded.

6. A fastening device for attachment of an object to a structural element comprising:

a pair of toggle members attached at their adjacent ends to one end of a toggle sleeve and having a spring attached to each toggle member and the toggle sleeve;

the toggle sleeve of hollow cylindrical form having axially along the longitudinal axis an inner surface defined therein which is threaded to receive a bolt; and the toggle members are of approximately semicircular cross section to fit around the toggle sleeve and the bolt when folded.

7. A fastening device for attachment of an object to a structural element comprising:

a sleeve of hollow cylindrical shape with a flanged end wherein an outer surface of the sleeve is threaded to be threadably engaged with a sleeve end of an expandable element;

the expandable element having an inner head and a middle portion between the inner head and the sleeve end;

the expandable element having an axial cavity defined therein along the longitudinal axis through which a bolt may be inserted and threaded into the inner head having threads therein;

the middle portion having a plurality of legs which buckle when the inner head is drawn toward the sleeve end by the rotation of the bolt; and the bolt having a head of radius large enough to cover the flanged end when the fastening element is secured.

8. The fastening element as in claim 7 wherein a lock washer is used between the flanged end and said object to be attached.

9. The fastening element as in claim 8 wherein the bolt having a head of radius large enough to have a cavity defined herein which encloses the flanged end and lock washer when the fastening element is secured.

* * * * *